Nov. 13, 1962    W. D. BENNETT ET AL    3,063,488
WHEELS FOR PNEUMATIC TYRES
Filed June 15, 1960    3 Sheets-Sheet 1
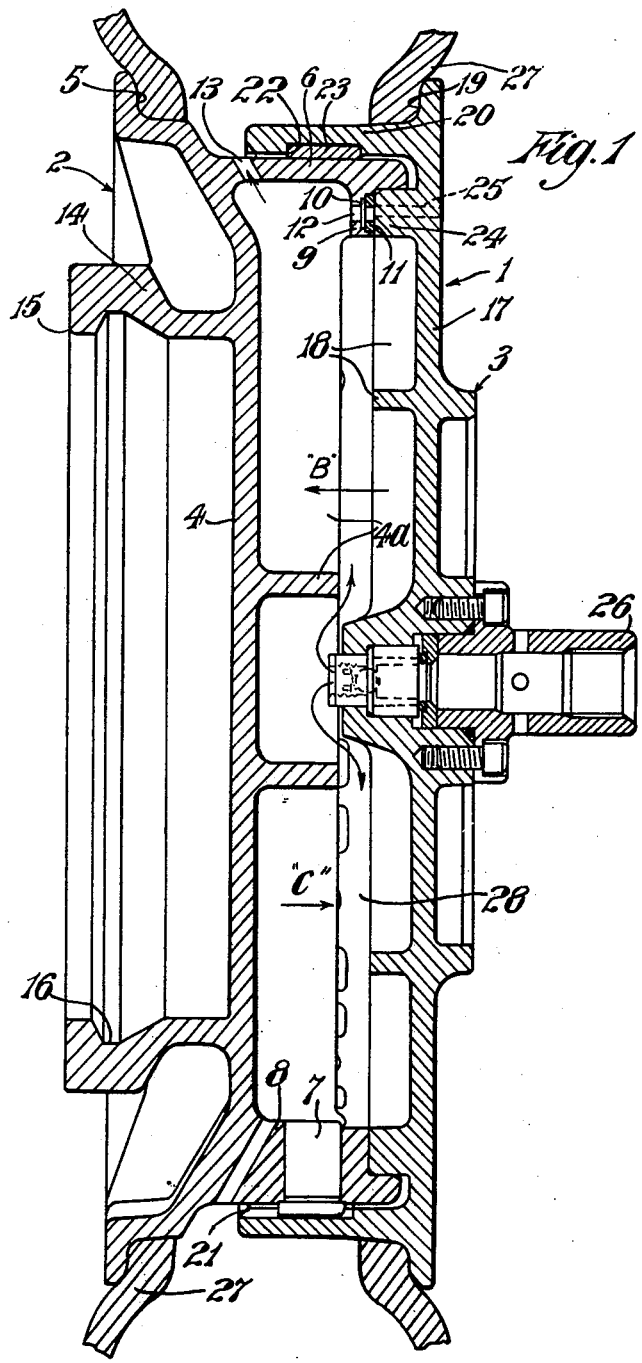

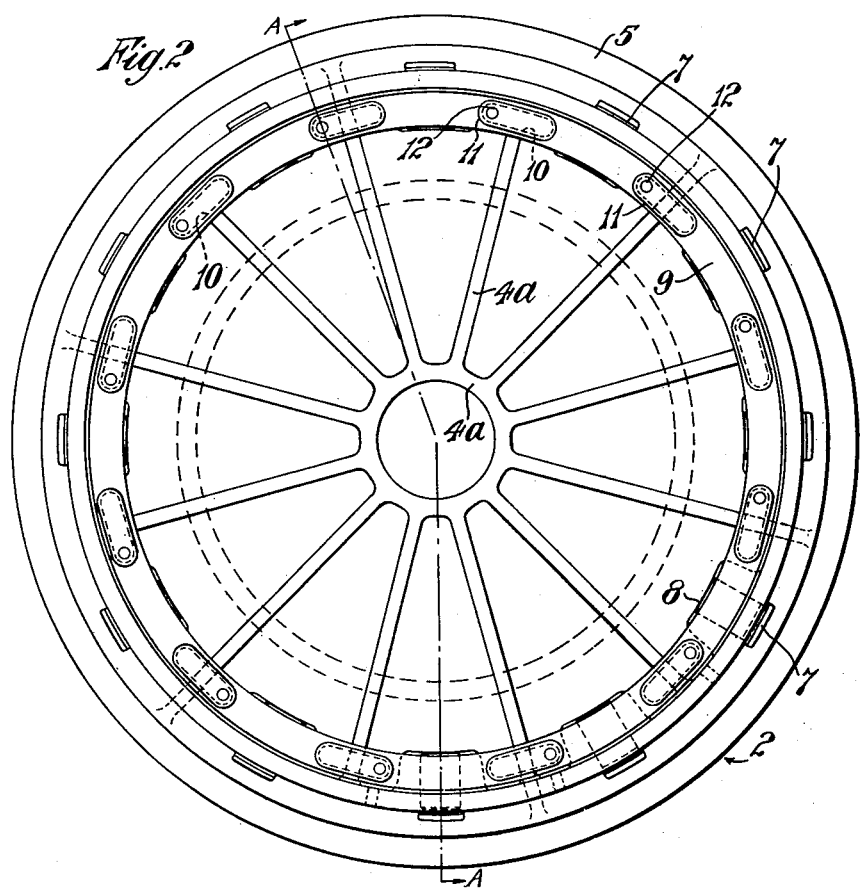

Nov. 13, 1962  W. D. BENNETT ET AL  3,063,488
WHEELS FOR PNEUMATIC TYRES
Filed June 15, 1960  3 Sheets-Sheet 3
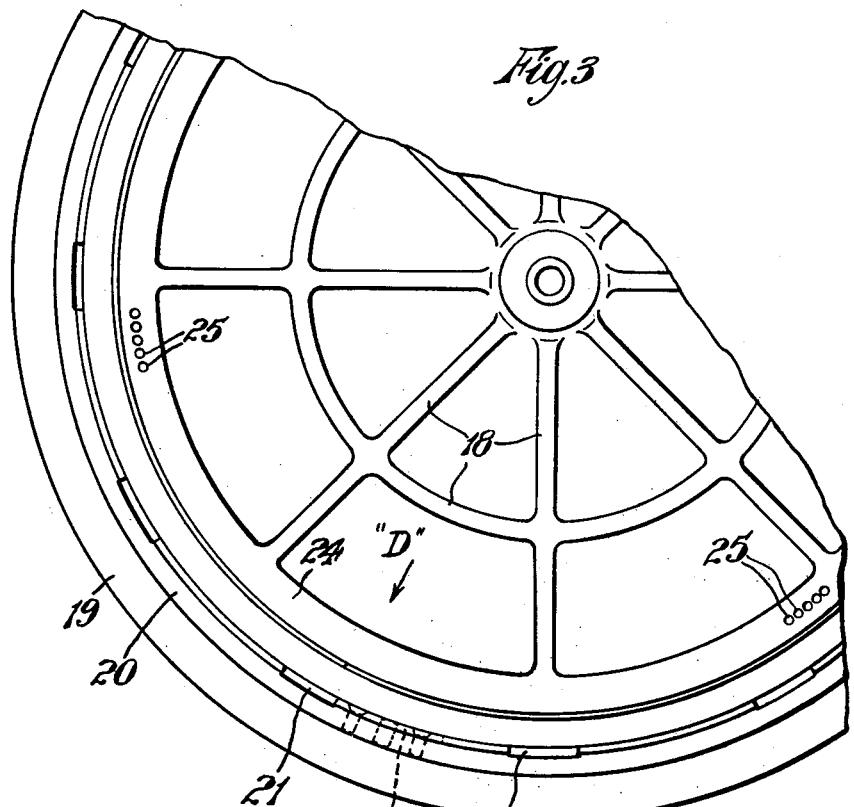
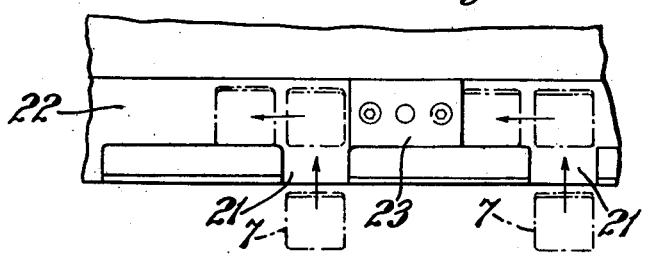
INVENTORS
William Douglas Bennett
Martyn Frederick Jenkins
by Benj. T. Rauber
their attorney 3,063,488
WHEELS FOR PNEUMATIC TYRES
William Douglas Bennett and Martyn Frederick Jenkins, Sutton Coldfield, England, assignors to Dunlop Rubber Company Limited, London County, England, a British company
Filed June 15, 1960, Ser. No. 36,437
Claims priority, application Great Britain June 18, 1959
7 Claims. (Cl. 152—10)

This invention relates to wheels for pneumatic tyres.

Various routine performance tests which are made on pneumatic tyres necessitate fitting a tyre to a wheel and inflating it. The type of wheel having a continuous well-base rim has the disadvantage, for test purposes, that the time taken for fitting or removal of the tyre respectively to or from the wheel is considerable. The conventional forms of divided-type wheel, on the other hand, whilst providing quicker assembly and dismantling, are not readily adaptable for use with tubeless tyres owing to difficulty in making their rims air-tight.

The present invention provides a wheel to or from which a pneumatic tyre may be quickly fitted or removed, and inflated without the use of an inner tube.

According to the invention, a circumferentially divisible wheel for a pneumatic tyre comprises a pair of wheel halves, each wheel half being provided on its outer periphery with a flange for fluid-tight sealing engagement with a tyre bead, the wheel halves being lockable in coaxial relationship to one another and disengageable one from the other, one wheel half being provided with a non-return valve whereby inflationary fluid may be admitted to a chamber bounded by the wheel halves, said chamber leading, when a tyre is mounted on the wheel, into the interior of the tyre.

Preferably, the wheel halves are lockable together by means of a bayonet fixing.

Preferably also, the portion of one wheel half which bounds the chamber is provided with an aperture for engagement with a sealing member carried by the other wheel half when the two halves are correctly relatively located and fully secured together, the said aperture allowing inflationary fluid to leak from the chamber when the halves are not correctly relatively located and fully secured together, and thus serving to prevent inflation pressure from being built up within the wheel.

One embodiment of the invention will now be described, by way of example, with reference to the accompanying drawings in which:

FIGURE 1 is a transverse sectional view, taken on line A—A in FIGURE 2 of a wheel and pneumatic tyre assembly the wheel having two halves according to the invention;

FIGURE 2 is a view, looking in the direction of arrow B in FIGURE 1, of one of the halves of the wheel;

FIGURE 3 is a view, looking in the direction of arrow C in FIGURE 1, of part of the other half of the wheel;

FIGURE 4 is a view, looking in the direction of arrow D of the wheel half shown in FIGURE 3.

A wheel 1 according to the invention comprises two wheel halves 2 and 3 as shown in FIGURE 1.

The wheel half 2 is formed from hard aluminum alloy and comprises a disc portion 4 reinforced with radially and circumferentially extending ribs 4a and provided with a bead seating portion 5 disposed around its outer periphery.

A cylindrical portion 6 of smaller diameter than the bead seating portion 5, and formed coaxially with the disc adjacent to the radially outermost portions of the disc, extends axially from one side of the disc. Twelve steel pins 7, having square flat heads, are pressed into holes drilled radially in equally-spaced positions in thickened portions 8 around the circumference of the portion 6 on a common pitch circle midway along the width of the said portion, the heads of the pins projecting radially outwardly of the wheel half 2 (see FIGURE 2).

A short annular radially inwardly-extending flange 9 is formed adjacent the end of the portion 6 remote from the disc 4. Twelve counterbored recesses 10 are provided in equally-spaced positions around the face of the flange 9 remote from the disc 4. Each recess 10 is elongated in the circumferential direction of the flange 9 and is provided with a rubber diaphragm 11 cemented at its periphery inside the counterbore of the recess. An axial hole 12, for a purpose to be described later, is provided in each diaphragm 11 and its associated recess 10, the hole passing through the diaphragm and flange 9 from one side to the other. Ten holes 13, equally spaced around the portion 6 adjacent to the disc 4, extend outwardly through the extension to provide for the passage of air to the interior of a tyre 27 mounted on the wheel.

A cylindrical extension 14, projecting axially from the side of the disc 4 remote from the portion 6, is provided at its other end with a short radially inwardly extending flange 15 and an annular recess 16 of shape complementary to that of a chuck fitted to the driving spindle of a tyre testing machine, such as, for example that described in the patent application of Gough et al., Ser. No. 47,634, filed Aug. 5, 1960.

The wheel half 3 (as shown in FIGURE 3) is formed of steel and comprises a disc portion 17, reinforced with radially and circumferentially extending ribs 18 and provided with a bead-seating portion 19 disposed around its outer periphery. A cylindrical portion 20 is formed integrally and coaxially with, and extends axially away from one side of the disc 17. The outside diameter of the portion 20 is slightly smaller than the bead seating portion 19 and its inside diameter is such that the portion 20 is a sliding fit over the cylindrical portion 6 of the wheel half 2. Axially extending cut-away portions 21, as shown in FIGURE 4, are provided for the reception of the headed pins 7 attached to the wheel half 2, the cut-away portions being disposed on the radially innermost cylindrical surface of the portion 20 at its end remote from the disc 17 in positions around its circumference corresponding to the positions of the headed pins. The cut-away portions 21 lead into an annular recess 22 also formed on the innermost cylindrical surface of the portion 20 so that the cut-away portions and the annular recess 22 together with the headed pins 7 form a bayonet fixing for attaching the wheel half 2 to wheel half 3 as will be described. A pair of metal stop plates 23 equal in thickness to the depth of the recess 22 are screwed into the recess in diametrically opposite positions and each in a position displaced circumferentially from the adjacent cut-away portions.

Radially within the cylindrical portion 20, an annular abutment 24 is formed for engagement with the flange 10 carrying the rubber diaphragm 11 of the wheel half 2. Three groups of five axially extending safety holes 25, the holes in each group being adjacent to one another and positioned on a common pitch circle about the axis of rotation of the wheel 1, are drilled completely through the abutment 24 with the three groups of holes equally spaced around the abutment. Each group of holes is positioned so that all the holes of the group will register with the undrilled portion of one of the rubber diaphragms 11 when the wheel halves 2 and 3 are correctly relatively located, this being accomplished (see chain-dotted parts of FIGURE 4) by moving the wheel halves towards each other so that the headed pins 7 enter the cut-away portions 21 and then rotating the wheel half 2 in the appropriate direction relative to the wheel half 3, so that the headed pins move along the recess 22, until further rotation in the same direction is prevented by contact of two of the pins 7 with the two stop plates 23. When the wheel halves 2 and 3 are not correctly located, however, one hole of each of the groups of holes will register with a hole 12 passing through one of the diaphragms 11 and the flange 9 for a purpose to be described.

The wheel half 3 is also provided with a non-return inflation valve 26 of conventional design, fitted so as to extend coaxially through the disc portion 17 from the side of the disc remote from the cylindrical portion 20.

To fit a tyre to the wheel, the wheel half 3 is positioned on a table with the portion 20 facing upwards and with its inflation valve 26 engaged internally by a suitable inflation nozzle attached to an air line (the inflation nozzle and air line are not shown).

One bead of a tyre 27 is slid onto the bead seating portion 19 of the wheel half 3, and the wheel half 2 is moved coaxially towards the wheel half 3 so that the heads of the pins 7 are secured, as described in the annular recess 22 and engage the stop plates 23. In this position the wheel halves are securely locked together by a "bayonetting" action, the safety holes 25 are all covered by the rubber diaphragms 11, and the flanges associated with the bead seats press the tyre beads axially inwardly thus providing a seal for the beads.

In this assembled condition, as shown in FIGURE 1, a chamber 28 is formed between the wheel halves 2 and 3. This chamber is bordered by the disc portions 4 and 17, the cylindrical portion 6 and the abutment 24, and is airtight to the local ambient atmosphere, but is connected to the interior of the tyre 27 by the radially outwardly extending holes 13 in the cylindrical portion 6.

The tyre is now inflated by means of the air line, the air passing through the inflation valve 26, into the chamber 28 and through the holes 13 into the tyre 27. The rubber diaphragms 11 covering the groups of safety holes 25 are pressed by the inflation pressure against the holes to prevent the escape of air, provided that the wheel halves 2 and 3 are correctly relatively located; e.g. as a result of insufficient relative rotation of the wheel halves, one or more of the holes 25 of each group would not be covered by the diaphragm 11 but would register with a hole 12 and the inflationary air would be allowed to escape through these holes. This avoids the possibility of air pressure being set up in the chamber 28 when the wheel is not in an assembled state suitable to withstand it.

It will be noted that whatever the angular orientation of the wheel halves relative to one another during assembly, there are sufficient diaphragms 11 provided so that three of the diaphragms will register with the three groups of safety holes 25 on bayonetting the two wheel halves together.

The wheel is dismantled by releasing the air pressure, relatively rotating the wheel halves in the opposite direction to that used in assembly and removing the tyre.

The wheel according to the invention has the advantages that it permits rapid fitting and removal of a tyre, and eliminates the need, usual with divided wheels, for an inner tube or flap. Furthermore, the "rim" of the wheel is not subjected to hoop stress due to inflation pressure since the inflation pressure is applied equally to both sides thereof.

In addition, the wheel is equipped with safety means, in the form of holes 25, to ensure that a tyre is not inflated on the wheel until the wheel is correctly assembled.

Having now described our invention, what we claim is:

1. A circumferentially divisible wheel for a pneumatic tyre comprising a pair of wheel halves, each wheel half being provided on its outer periphery with a flange for fluid-tight sealing engagement with a tyre bead, the wheel halves being relatively rotatable and being lockable in coaxial relationship to one another and disengageable one from the other by relative rotational movement of the wheel halves in the appropriate direction, a non-return valve being provided on one wheel half whereby inflationary fluid may be admitted to a chamber bounded by the wheel halves, said chamber leading, when a tyre is mounted on the wheel, into the interior of the tyre, and a sealing member provided on one wheel half, the other half having an air escape aperture, the sealing member and the aperture being so disposed relatively to one another that upon inflationary pressure being applied to the tyre, the sealing member is in fluid-tight engagement with the aperature only when the two wheel halves are correctly relatively located and fully secured together.

2. A wheel according to claim 1 wherein the wheel halves are lockable together by means of a bayonet fixing.

3. A wheel according to claim 1 wherein a plurality of air escape apertures are provided, the apertures being so disposed relative to the sealing member that they are all in sealing relationship therewith only when the two wheel halves are correctly relatively located and fully secured together.

4. A wheel for a pneumatic tyre which comprises a pair of circular discs spaced axially and each having a bead seat for a tyre and having a coaxial cylindrical flange on its inner face radially inwardly of said bead seats telescoping with the flange of the other disc to form an enclosure, one of said flanges having a passage to the space between the bead seats, one of said flanges having bayonet slots, and the other having pins engaging said slot, and an inflation valve in one of said discs.

5. The wheel of claim 4 in which one of said discs has a cylindrical extension from its outer face coaxial with said flange.

6. The wheel of claim 4 in which one of said discs has apertures and the other has seals to close all of said apertures when said discs are rotated to complete closing and locking positions.

7. The wheel of claim 4 having stops in said bayonet slots to stop said pins when said discs are rotated relatively to locked positions.

References Cited in the file of this patent

UNITED STATES PATENTS

| | | |
|---|---|---|
| 924,334 | Fouch | June 8, 1909 |
| 1,710,265 | Llewellyn | Apr. 23, 1929 |
| 1,923,975 | Harlan | Aug. 22, 1933 |
| 2,931,414 | Jankowski | Apr. 5, 1960 |